United States Patent
Wiley et al.

(10) Patent No.: US 10,710,404 B2
(45) Date of Patent: Jul. 14, 2020

(54) DRIVEN CASTER WHEEL AND ASSEMBLY

(71) Applicant: Facebook, Inc., Menlo Park, CA (US)

(72) Inventors: Scott C. Wiley, Los Altos, CA (US); Andrew Gold, Los Altos, CA (US); Ryan Christopher Cargo, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/828,349

(22) Filed: Nov. 30, 2017

(65) Prior Publication Data
US 2019/0160868 A1 May 30, 2019

(51) Int. Cl.
  *B60B 33/00* (2006.01)
  *B60B 35/16* (2006.01)
  *B60B 35/12* (2006.01)

(52) U.S. Cl.
  CPC ........ *B60B 33/0052* (2013.01); *B60B 33/006* (2013.01); *B60B 33/0028* (2013.01); *B60B 33/0039* (2013.01); *B60B 33/0055* (2013.01); *B60B 33/0068* (2013.01); *B60B 33/0078* (2013.01); *B60B 35/121* (2013.01); *B60B 35/124* (2013.01); *B60B 35/16* (2013.01)

(58) Field of Classification Search
  CPC ............ B60B 33/0052; B60B 33/0028; B60B 33/0039; B60B 33/0055; B60B 33/006; B60B 33/0068; B60B 35/121; B60B 35/124; B60B 35/16
  See application file for complete search history.

(56) References Cited

U.S. PATENT DOCUMENTS

| 4,463,821 A | 8/1984 | Falamak |
| 4,519,466 A * | 5/1985 | Shiraishi ................. B60B 19/00 180/252 |

(Continued)

FOREIGN PATENT DOCUMENTS

| JP | 62-74774 A | 4/1987 |
| JP | 2004-295429 A | 10/2004 |

(Continued)

OTHER PUBLICATIONS

Notice of Allowance received for U.S. Appl. No. 15/828,365 dated May 21, 2019, 83 pages.

(Continued)

*Primary Examiner* — Jeffrey O'Brien
(74) *Attorney, Agent, or Firm* — FisherBroyles, LLP

(57) ABSTRACT

A driven caster wheel assembly may include a wheel, an axle, a drive assembly, a drive shaft, and a bevel gear. The wheel may be mounted to the axle for rotation about a drive axis and steering about a substantially vertical steering axis. The drive shaft may extend along the steering axis from a first end to a second end, with the first end being connected to the axle and the second end being connected to the drive assembly such that the drive assembly controls rotation of the drive shaft about the steering axis. The bevel gear may connect the first end to the axle such that rotation of the drive shaft about the steering axis controls rotation of the wheel about the drive axis to drive the driven caster wheel assembly in a substantially horizontal direction. Various other assemblies and methods are also disclosed.

20 Claims, 8 Drawing Sheets

(56) References Cited

U.S. PATENT DOCUMENTS

| | | | |
|---|---|---|---|
| 4,616,730 A | 10/1986 | Strehler et al. | |
| 4,683,973 A | 8/1987 | Honjo et al. | |
| 4,778,024 A | 10/1988 | Matsumoto et al. | |
| 5,350,033 A | 9/1994 | Kraft | |
| 5,419,008 A * | 5/1995 | West | B25J 5/005 |
| | | | 16/25 |
| 5,515,934 A | 5/1996 | Davis | |
| 6,491,127 B1 * | 12/2002 | Holmberg | B60K 7/0007 |
| | | | 180/21 |
| 7,024,842 B2 | 4/2006 | Hunt et al. | |
| 7,384,233 B2 * | 6/2008 | Segerljung | B60B 19/003 |
| | | | 414/685 |
| 7,617,890 B2 | 11/2009 | Rornig | |
| 8,348,002 B2 | 1/2013 | Checketts et al. | |
| 8,370,990 B2 | 2/2013 | Yu et al. | |
| 8,496,077 B2 | 7/2013 | Nesnas et al. | |
| 8,757,309 B2 | 6/2014 | Schmitt et al. | |
| 8,812,187 B2 | 8/2014 | Lunden | |
| 9,020,639 B2 | 4/2015 | Bewley et al. | |
| 9,359,005 B2 | 6/2016 | Doan et al. | |
| 10,059,004 B2 | 8/2018 | Inaba et al. | |
| 10,065,690 B2 | 9/2018 | Summer et al. | |
| 10,207,403 B1 | 2/2019 | Wiley | |
| 10,286,558 B1 | 5/2019 | Asada et al. | |
| 10,421,326 B2 | 9/2019 | Wiley et al. | |
| 10,486,755 B2 | 11/2019 | Wiley | |
| 2004/0177474 A1 * | 9/2004 | Swanborough | B60B 19/00 |
| | | | 16/35 R |
| 2007/0240928 A1 | 10/2007 | Coltson et al. | |
| 2012/0066846 A1 | 3/2012 | Yu et al. | |
| 2017/0043831 A1 | 2/2017 | Zhu | |
| 2018/0169685 A1 | 6/2018 | Taylor et al. | |
| 2018/0330325 A1 | 11/2018 | Sibley | |
| 2019/0163183 A1 | 5/2019 | Wiley | |

FOREIGN PATENT DOCUMENTS

| | | |
|---|---|---|
| JP | 2010-094802 A | 4/2010 |
| JP | 2015-070981 A | 4/2015 |

OTHER PUBLICATIONS

Notice of Allowance received for U.S. Appl. No. 15/828,387 dated Jul. 31, 2019, 31 pages.

Preinterview First office Action received for U.S. Appl. No. 15/828,387 dated May 6, 2019, 9 pages.

Preinterview First Office Action received for U.S. Appl. No. 15/828,423 dated Aug. 1, 2019, 24 pages.

Notice of Allowance received for U.S. Appl. No. 15/828,414 dated Oct. 11, 2018, 17 pages.

* cited by examiner

DRIVEN CASTER WHEEL AND ASSEMBLY

BACKGROUND

Caster wheels have found use in a nearly unlimited number of applications, from office shopping carts, to wheelchairs, to robots, among a host of other scenarios. Caster wheels are typically mounted to an object to enable rolling or otherwise linear movement of the object in a generally horizontal direction. Some caster wheels may even be powered or driven. For example, a power assembly (such as an electric motor) may control rotation of a caster wheel's axle, which may in turn control rotation of the wheel thereabout. Some powered or driven caster wheels may also include brake assemblies designed to retard rotation of the wheel axle and thus slow or stop rotation of the wheel. Traditionally, at least a portion of this power assembly (e.g., the motor), as well as the brake, are disposed within the circumference of the wheel, near the wheel hub, and adjacent to the axle.

The placement of a power assembly or brake within the circumference of a caster wheel, however, can lead to various disadvantages. For example, when an electrical component of the power assembly (e.g., motor) is disposed within the circumference of the wheel, the motor may be exposed to whatever conditions the wheel moves through. This is particularly problematic for driven caster wheels that are intended for off-roading vehicles or vehicles intended to drive through water.

In addition, when all or some of the power assembly is located within the circumference of the wheel, the electrical wires that provide electricity to the power assembly may limit the maneuverability of the wheel since the wheel may be unable to rotate 360 degrees without entangling the wires. This is especially disadvantageous for driven caster assemblies intended to move highly maneuverable robots.

Positioning all or some of the power assembly within the circumference of the wheel may also lead to an increased risk of damage to the power assembly. For instance, when the driven caster wheel is part of a robot or other object that is susceptible to falling or being dropped, the power assembly may be damaged by such forceful impacts. Similar issues arise when positioning brake assemblies within the circumference of a caster wheel.

As such, the instant disclosure identifies and addresses a need for improved caster wheels and caster wheel assemblies.

SUMMARY

As will be described in greater detail below, the instant disclosure describes a driven (or powered) caster wheel and various assemblies that make use of the same. The wheel may be driven by a power assembly that controls rotation of a substantially vertically extending drive shaft, which may be connected to the wheel axle via a bevel gear. Thus, the power assembly may be located entirely outside of the circumference of the wheel.

In some embodiments, a driven caster wheel assembly may include a wheel, an axle, a drive assembly, a drive shaft, and a bevel gear. The wheel may be mounted to the axle to enable rotation about a drive axis and steering about a substantially vertical steering axis. The drive shaft may extend along the steering axis from a first end to a second end, with the first end being connected to the axle and the second end being connected to the drive assembly such that the drive assembly controls rotation of the drive shaft about the steering axis. The bevel gear may connect the first end to the axle such that rotation of the drive shaft about the steering axis controls rotation of the wheel about the drive axis to drive the driven caster wheel assembly in a substantially horizontal direction. Various other assemblies and methods are also disclosed.

In some embodiments, the drive axis and the steering axis together form an oblique angle such that the wheel is tilted relative to the drive shaft. The drive assembly may be located entirely above the wheel. The drive assembly may include a drive motor and a drive belt controlled by the drive motor, with the drive belt being wrapped around the second drive shaft end for rotating the drive shaft about the steering axis.

The driven caster wheel assembly may also include a brake disposed on the second drive shaft end and configured to retard motion of the drive shaft to thereby retard motion of the wheel. In one example, the brake may represent a disc brake that includes a disc and a pair of pads. The disc may be arranged on the second drive shaft end and configured to rotate about the steering axis along with the drive shaft. The pads may be arranged on top and bottom sides of the disc. In addition, the pads may be compressible against the top and bottom sides of the disc to retard rotation of the disc and thereby retard rotation of the drive shaft.

The driven caster wheel assembly may further include a steer assembly and a steer shaft. The steer shaft may extend along the steering axis from a first steer shaft end to a second steer shaft end, with the first steer shaft end being connected to the axle and the second steer shaft end being connected to the steer assembly such that the steer assembly controls rotation of the steer shaft about the steering axis, which in turn steers the wheel about the steering axis. The drive shaft may be concentrically arranged inside of the steer shaft. The steer assembly may include a steer motor and a steer belt controlled by the steer motor, with the steer belt being connected to the second steer shaft end for rotating the steer shaft about the steering axis.

In some embodiments, the wheel is configured to freely rotate 360 degrees about the steering axis. In addition, the bevel gear may include a miter gear. In some embodiments, the driven caster wheel assembly includes a chassis on which the drive assembly is mounted, the chassis is located above the tire, and the entire drive assembly is located on the chassis.

In some embodiments, the wheel is configured to roll along a surface. The bevel gear may be configured such that the wheel is tilted relative to the steering axis so that the wheel is steerable about the steering axis at a single point of rotation. In some embodiments, the wheel includes a propeller wheel for converting rotational movement into thrust.

A mobile platform that is driven by at least one driven caster wheel is also disclosed. In some examples, this mobile platform may include a chassis, having a top side and a bottom side, a drive assembly, a driven caster wheel, a drive shaft, and a bevel gear. The drive assembly may be disposed on the top side of the chassis. The driven caster wheel may be mounted to an axle for rotation about a drive axis and steering about a substantially vertical steering axis. The drive shaft may extend along the vertical steering axis from a first drive shaft end to a second drive shaft end. The first drive shaft end may be connected to the axle and the second drive shaft end may extend to the top side of the chassis and connect to the drive assembly such that the drive assembly controls rotation of the drive shaft about the vertical steering axis. The bevel gear may connect the first drive shaft end to the axle such that rotation of the drive shaft about the vertical steering axis controls rotation of the wheel about the drive axis.

A method of assembling a driven caster assembly is also disclosed. In one example, this method may include mounting a driven caster wheel to an axle for rotation about a drive axis and for steering about a substantially vertical steering axis. The method may also include connecting a drive assembly to a second end of a drive shaft such that the drive assembly controls rotation of the drive shaft about the substantially vertical steering axis. The drive shaft extends along the steering axis from the second drive shaft end a first drive shaft end. The method may also include connecting the first drive shaft end to the axle via a bevel gear such that rotation of the drive shaft about the steering axis controls rotation of the wheel about the drive axis to drive the driven caster assembly in a substantially horizontal direction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
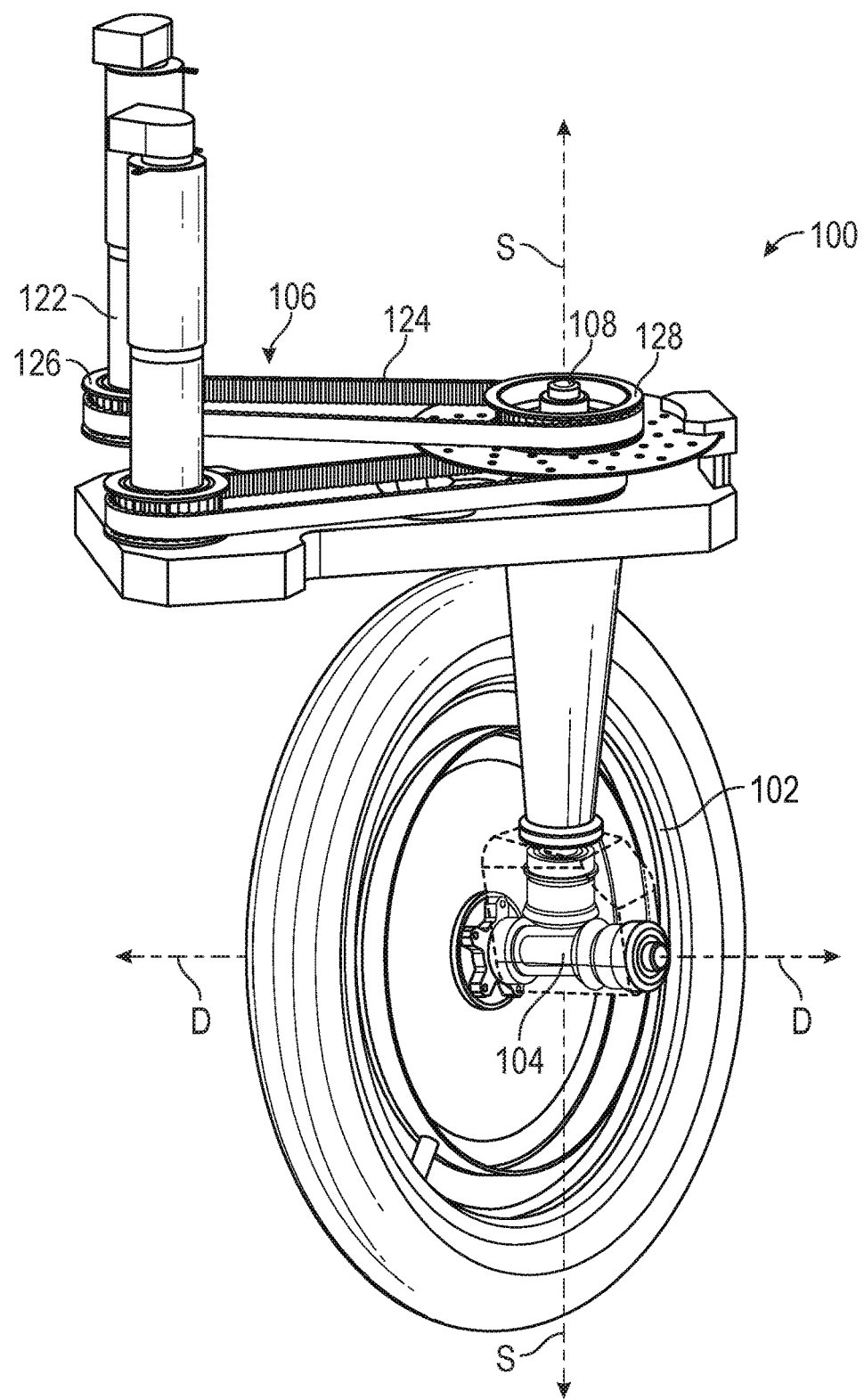
FIG. 1 is a side perspective view of a driven caster, according to an embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a driven caster wheel and various assemblies that may benefit from driven caster wheels. As will be explained in greater detail below, embodiments of the instant disclosure may include a driven (or powered) caster wheel that is driven by a power assembly (which may include both a drive assembly and a steering assembly) via a drive shaft and bevel gear arrangement. The power assembly may drive rotation of the wheel about an axle to move the wheel in a substantially horizontal direction, while the wheel may be steerable via a steer shaft that extends along a substantially vertical steering axis. The power assembly may be connected to one end of the drive shaft to control its rotation about the steering axis. The other end of the drive shaft may be connected to the wheel axle via a bevel gear. The drive shaft may extend from the axle to a location above the wheel where it connects to the power assembly.

Thus, the entire power assembly may be located entirely outside the circumference of the wheel (e.g., entirely above the wheel). As such, because the power assembly may be disposed distally from the wheel, components of the power assembly may be protected, for example, from environmental conditions that may surround the wheel. This may be particularly advantageous for driven caster wheels mounted to off-roading vehicles or vehicles intended to move through water. Also, a power assembly that is distally located from the wheel may be better protected from forceful impacts, for instance, when the driven caster wheels are mounted to a robot that is susceptible to falling or being dropped. In addition, the driven caster wheel disclosed herein may allow the wheel to freely rotate 360 degrees about its steering axis without becoming entangled by electrical wires or other components of the drive assembly. This driven caster may also have a brake assembly that is disposed distally from the wheel, which may similarly protect the brake assembly from impact and environmental damage.

The following will provide, with reference to FIGS. 1-7, detailed descriptions of a driven caster. FIG. 1 is a perspective view of a driven caster 100, according to an embodiment. The driven caster 100 may include a wheel 102 that is mounted to an axle 104 for rotation about a drive axis D. In this example, the rotation of the wheel 102 about the drive axis D may be controlled by a drive assembly 106 that is located above the wheel 102. A drive shaft 108 may extend substantially vertically from the drive assembly 106 to the axle 104 and rotate about a substantially vertical steer axis S. A bevel gear 114 (shown in FIG. 3) may connect the drive shaft 108 to the axle 104 to translate torque and power from the drive assembly 106 to the wheel 102. As shown in FIG. 1, the entire drive assembly 106 may be located above the wheel 102, which may protect the driven caster 100 from damage. For example, by positioning the electrical components of the power assembly (which may include both a drive assembly and a steering assembly, as detailed below), the driven caster 100 may be able to drive through deep water or survive other environmental conditions.

Figure 2:
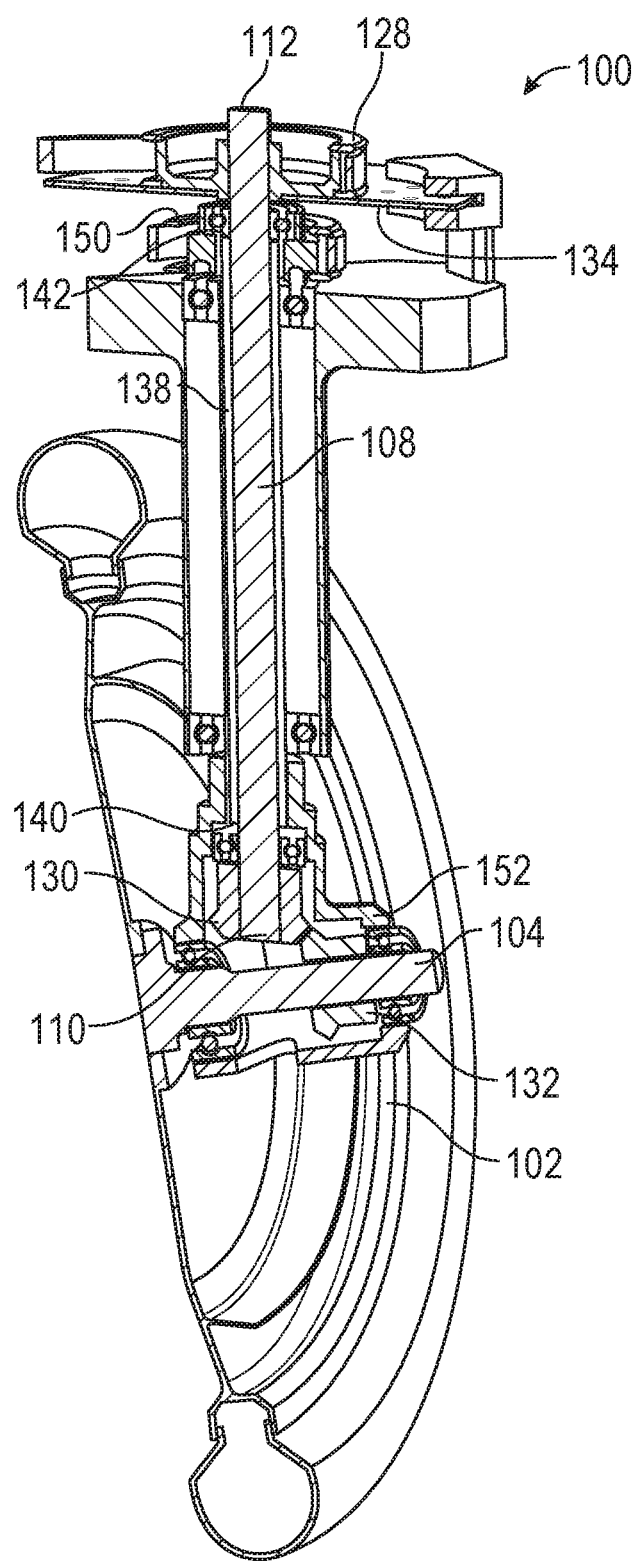
FIG. 2 is a cross-sectional view of the driven caster of FIG. 1.
Figure 3:
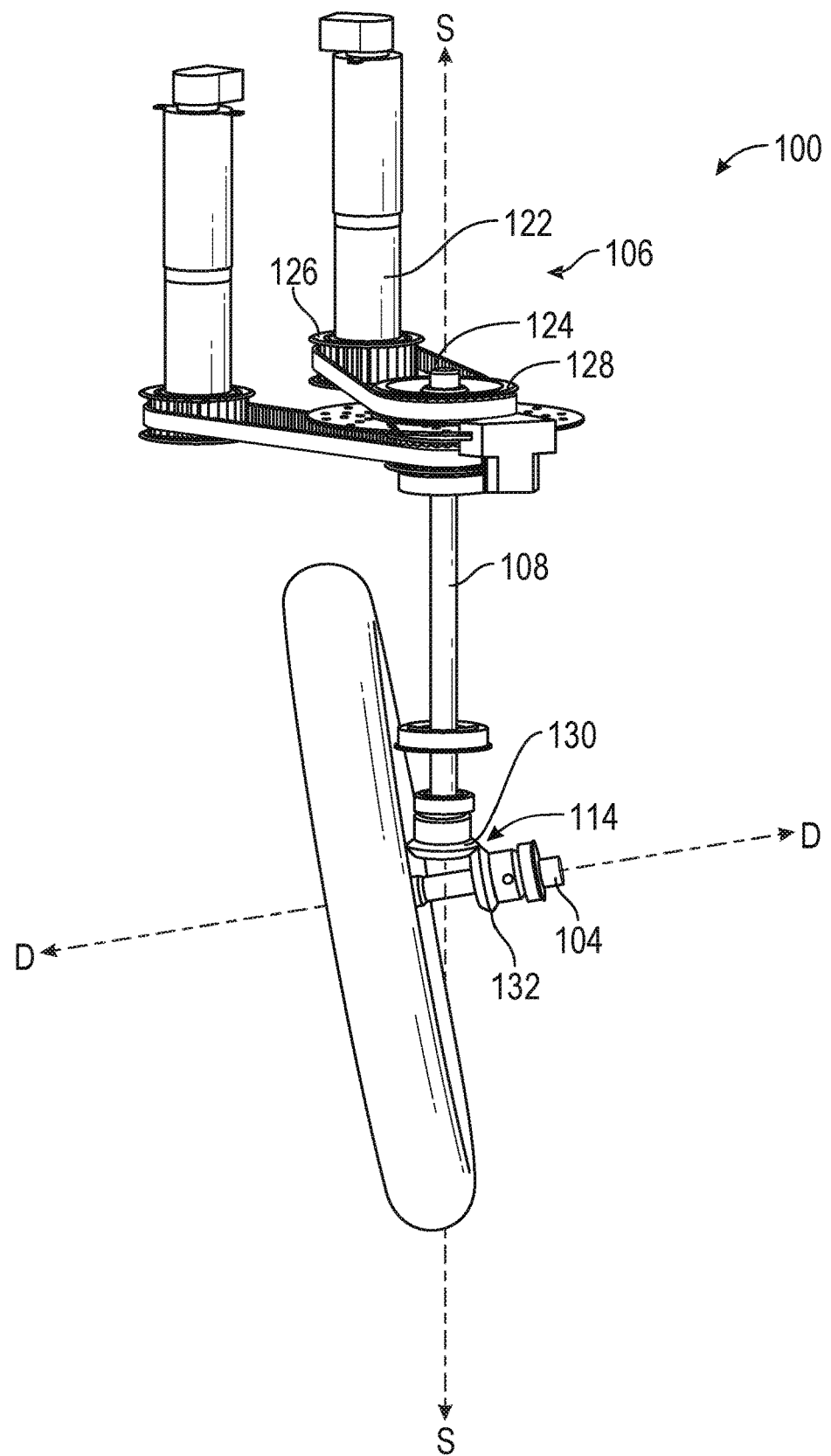
FIG. 3 is a front perspective view of the driven caster of FIG. 1, with the steer shaft, shaft housing, and casting removed.
Figure 4:
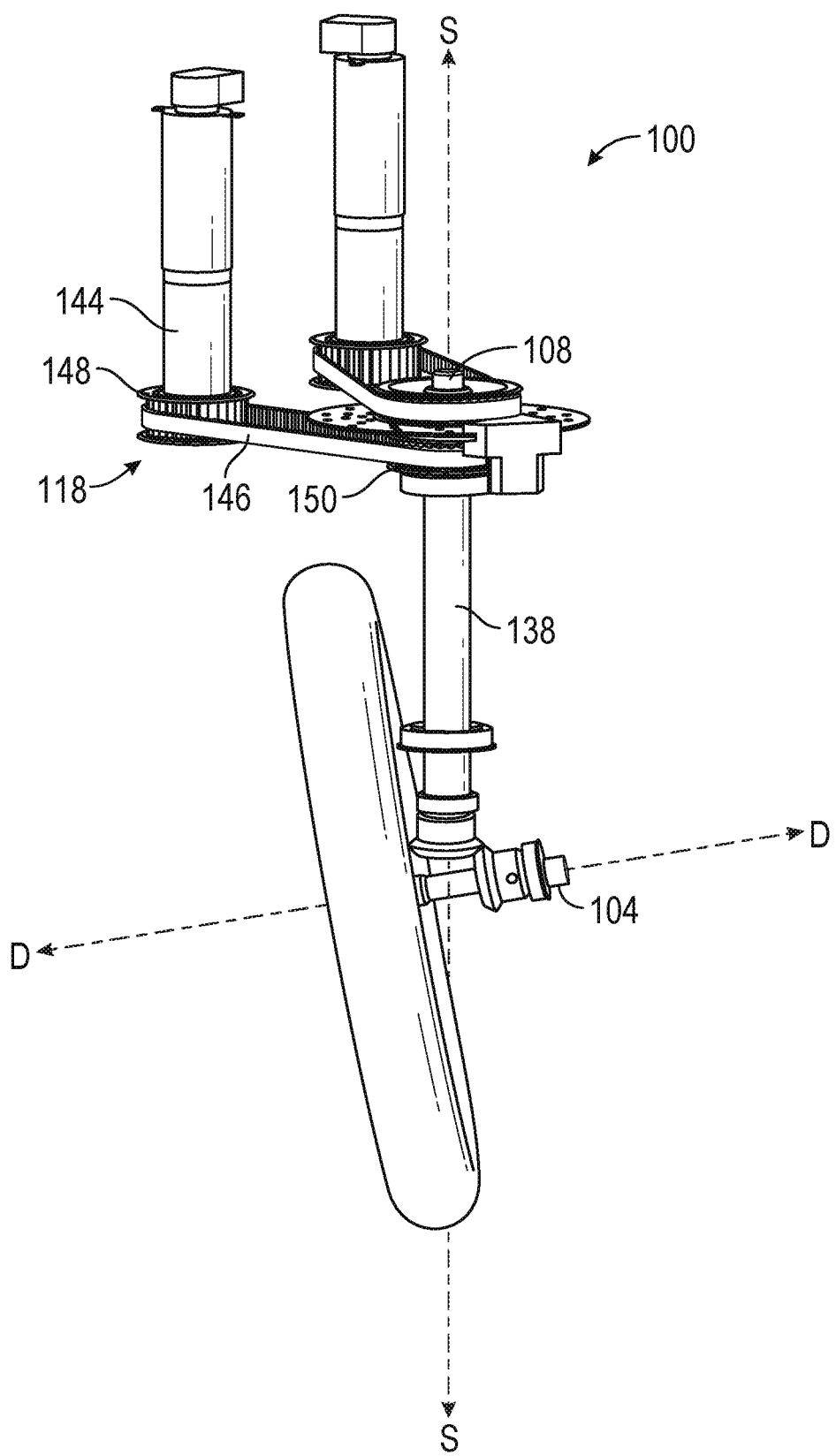
FIG. 4 is a front perspective view of the driven caster of FIG. 1, with the shaft housing and casting removed.
Figure 5:
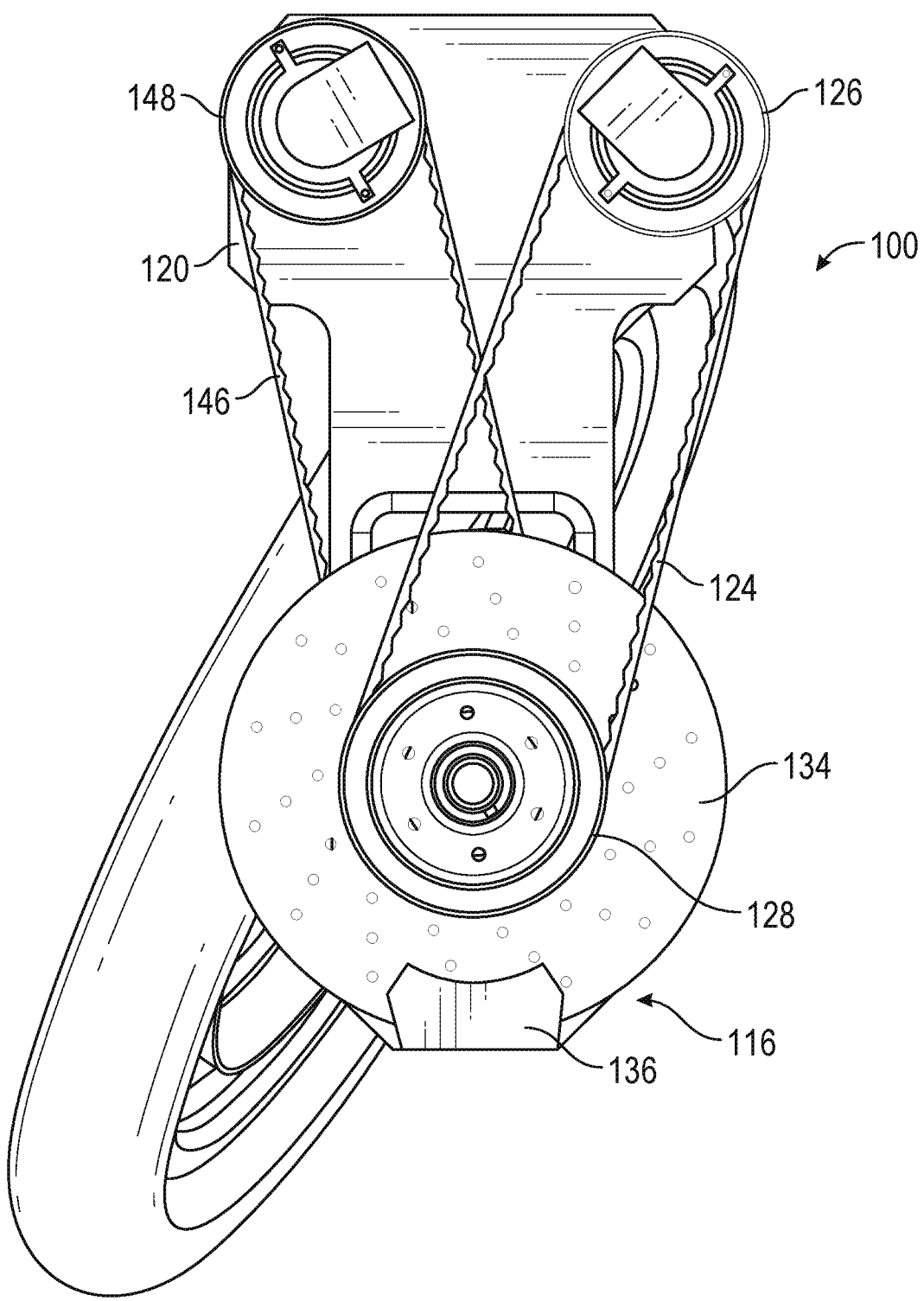
FIG. 5 is a top view of the driven caster of FIG. 1.
Figure 7:
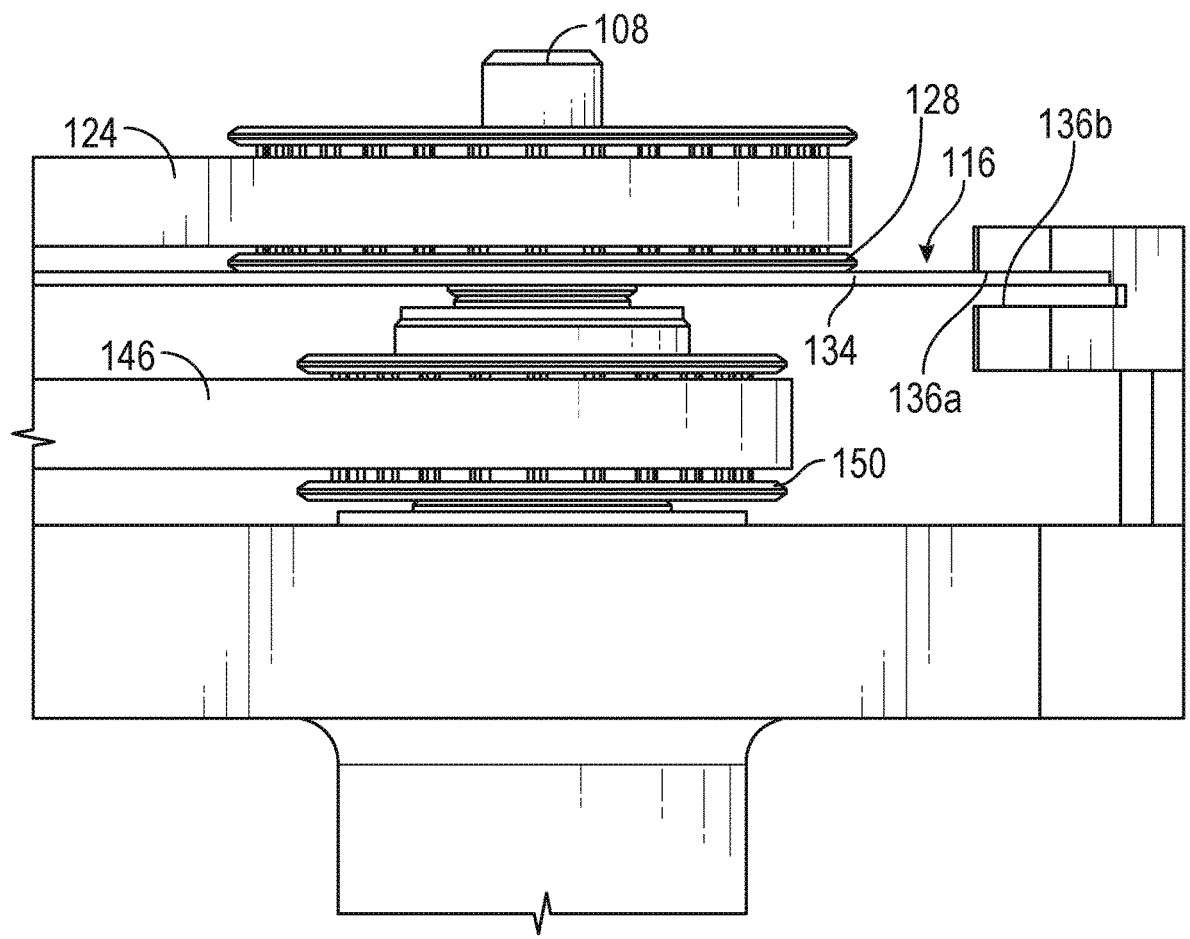
FIG. 7 is a blown-up side view of the driven caster of FIG. 1.

In some embodiments, the drive assembly 106 includes a drive motor 122 and a drive belt 124 that rotates about pulleys 126, 128. With reference to FIGS. 2, 3 and 7, in some embodiments, the lower portion of the drive motor 122 rotates about a substantially vertical drive motor axis that extends substantially parallel to the steering axis S. Pulleys 126, 128 may be mounted to the lower portion of the drive motor 122 and upper portion of the drive shaft 108, respectively. Drive belt 124 may extend between the pulleys 126, 128 and within a plane substantially perpendicular to the drive motor axis and steer axis. Thus, the drive motor 122 may cause the pulley 126 to move about the drive motor axis, which may in turn cause the drive belt 124 to move about pulleys 126, 128, thereby causing the pulley 128 and the drive shaft 108 to rotate about the steering axis S. As will be described in greater detail below, the torque and power from the drive motor 122 may be transferred from the drive shaft 108 to the axle 104 via a bevel gear 114 (see, e.g., FIG. 3).

As shown in FIGS. 1-4, the drive shaft 108 and axle 104 may function as the shafts of the bevel gear 114. Mating gears 130, 132 may be disposed on the lower portion of the drive shaft 108 and axle 104. Thus, the bevel gear 114 may transfer and change the direction of the power and torque from the drive shaft 108 to the wheel 102. In the embodiment shown in FIGS. 1-7, the bevel gear 114 is a miter gear, and the mating gears 130, 132 provide a gear ratio of 1:1. The bevel gear, however, can have other suitable configurations and gear ratios while remaining within the scope of this disclosure. Also, the intersection of the drive and steering axes can form any suitable angle while remaining within the scope of this disclosure. It should be noted that in FIGS. 1-4, the individual teeth of the mating gears 130, 132 are not shown, but rather the pitch surfaces of the gears are provided. Those skilled in the art will appreciate that the mating gears 130, 132 may include any suitable number of teeth.

Figure 6:
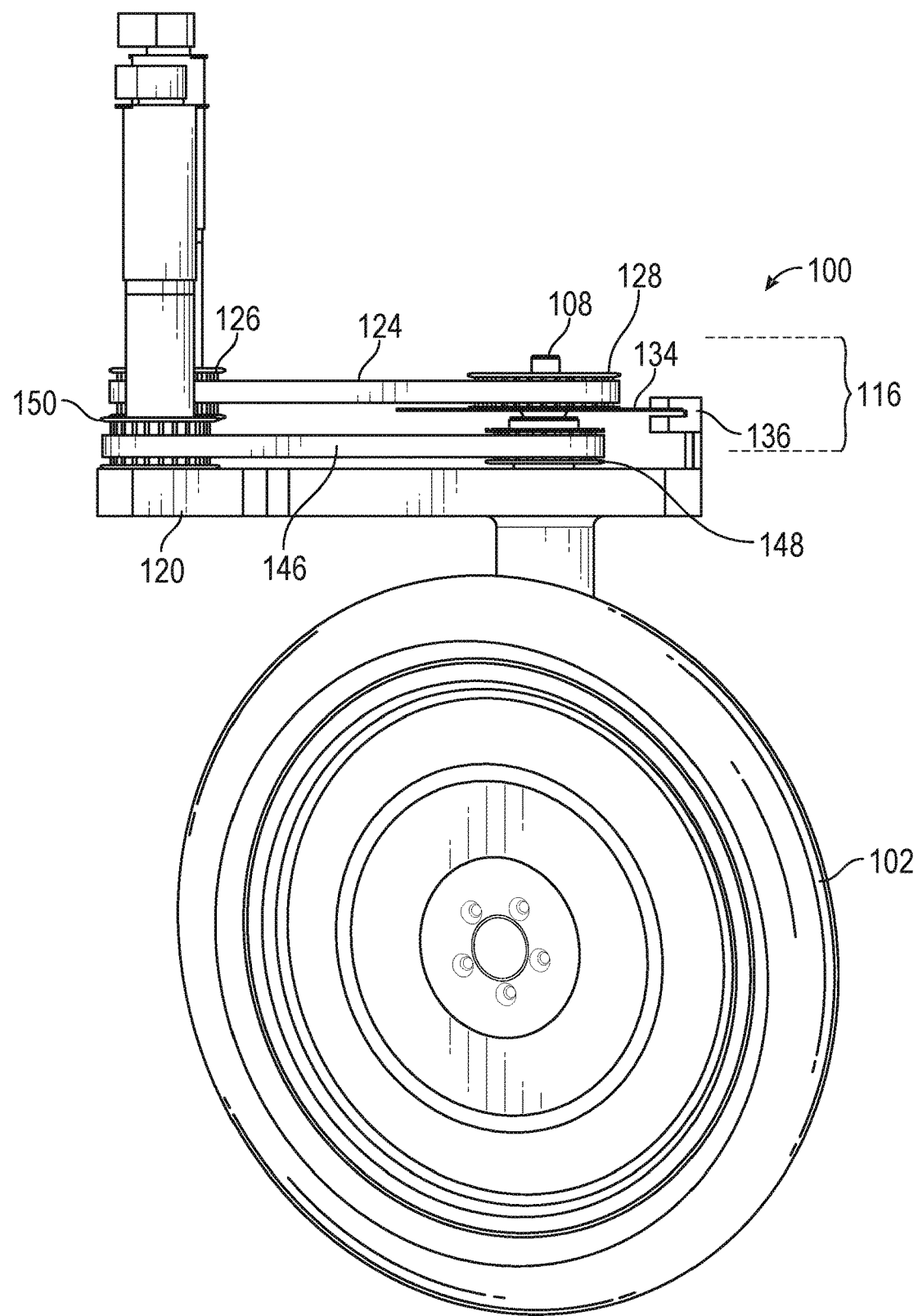
FIG. 6 is a side view of the driven caster of FIG. 1.

As described herein, drive power may be provided to the wheel 102 by way of the substantially vertical drive shaft 108 that extends along only one side of the wheel 102 from the axle 104 to a location entirely above the wheel (e.g., above chassis 120 in FIG. 6). As such, the wheel 102 may be able to freely rotate 360 degrees about the steering axis S. This configuration may offer many advantages from a steering and maneuverability standpoint. In addition, the configuration of the drive shaft 108 and bevel gear 114 may result in a driven caster 100 that may be free of wires or other electrical components extending close to the wheel itself. For example, since drive shaft 108 receives power at its upper end 112, and transfers power to the wheel 102 at its lower end 110 via the bevel gear 114, the drive motor 122 and all electrical components may be disposed far above the wheel itself 102, leaving a simple gearing configuration proximate the wheel 102.

In some embodiments, a brake 116 may also be disposed entirely above the wheel 102. The brake 116 may be disposed on the upper drive shaft end 112 and configured to retard motion of the drive shaft 108 about the steering axis, thereby retarding motion of the wheel 102 about the drive axis. Any suitable brake configuration may be used. In one example, the brake 116 may represent a disc brake, including a disc 134 arranged on the upper drive shaft end 112 and configured to rotate about the steering axis along with the drive shaft. As shown in FIGS. 6 and 7, the disc 134 may be mounted to the upper drive shaft end 112 by being mounted to the drive pulley 128. The disc 134 may have top and bottom surfaces, with each extending in a horizontal plane that is substantially perpendicular to the steering axis. A retarding mechanism 136 may be provided to retard motion of the disc 134. Any suitable type of retarding mechanism may be provided. In the embodiment herein described, the retarding mechanism 136 includes top and bottom pads 136a, 136b disposed proximate the top and bottom surfaces of the disc 134, respectively. At least one of the pads 136a, 136b may be compressible towards the disc 134 such that the pads 136a, 136b pinch the disc 134 to thereby retard its motion about the steering axis.

In the embodiment shown and herein described, a steer assembly 118 is provided to control the steering of the wheel 102 about the steering axis. A steer shaft 138 may extend along the steering axis from a bottom steer shaft end 140 to a top steer shaft end 142. The bottom steer shaft end 140 may be connected to the axle 104 (via, e.g., a casting 152 that surrounds bevel gear 114), and the top steer shaft end 142 may be connected to the steer assembly 118 (via, e.g., steer pulley 150), such that the steer assembly 118 controls rotation of the steer shaft 138 about the steer axis, which in turn steers the wheel 102 about the steering axis. The bottom steer shaft end 140 may be mounted to the axle 104 (via, e.g., casting 152) such that the axle 104 rotates about the steering axis along with the steer shaft 138, thus causing the wheel 102 to rotate about the steer axis. As described in further detail below, the wheel 102 may be tilted with respect to the steer axis.

In one example, the steer assembly 118 may include a steer motor 144, steer belt 146, and steer pulleys 148, 150, the operation of which may be similar to that of the drive assembly 106. The steer motor 144 may extend substantially vertically, adjacent to the drive motor 122. The steer belt 146 and steer pulleys 148, 150 may rotate within a plane that is substantially parallel to and below the plane in which the drive motor 122, drive belt 124, and drive pulleys 126, 128 rotate. The steer pulley 150 that is arranged on the steer shaft 138 may be disposed beneath the drive pulley 128 that is arranged on the drive shaft 108.

In some embodiments, the steer shaft 138 is arranged concentrically with respect to the drive shaft 108. More particularly, the steer shaft 138 and drive shaft 108 may each extend along the steer axis, with the drive shaft 108 being disposed within the steer shaft 138. As such, and as shown in FIGS. 1-3, the drive shaft 108 may be connected to the axle 104 via the bevel gear 114, and the steer shaft 138 may be mounted to the axle 104 via a casting 152 that is disposed around the bevel gear 114.

As shown in FIG. 3, in some embodiments, the bevel gear 114 is configured so that the wheel 102 is tilted with respect to the steering axis. This tilt may reduce scrubbing action when the wheel turns, and thus improve durability and steering capabilities. As shown in FIG. 3, a wheel axis may extend along the length of the wheel, perpendicular to the drive axis. In this example, the wheel axis does not extend parallel to the steer axis, but rather is tilted at an angle relative thereto. As such, while the drive shaft 108 and steering axis S extend in a substantially vertical direction, the axle 104 and drive axis D may extend in a direction that is not perfectly horizontal. In other words, the bevel gear 114 may be configured such that the steering axis S and drive axis D form an angle that is oblique. In some examples, the wheel 102 is tilted at an angle so that when the driven caster 100 is on a surface, the wheel 102 rotates about the steering axis S at a point that is its center of mass. For example, for a wheel and tire configuration having a diameter substantially equal to 16 inches, the bevel gear 114 may be configured so that the angle between the drive axis D and steering axis S is about 110 degrees and, thus the angle between the steering axis S and the wheel 102 is equal to about 20 degrees.

Referring to FIGS. 1, 5, 6, and 7, in some embodiments, the caster wheel is mounted on a chassis 120 to make up part of a mobile platform. Other suitable components or systems (e.g., a hospital bed, a cart, a robot, etc.) can be connected to or mounted on the chassis 120 so that movement of the driven caster controls movement of the components or system. As shown in FIGS. 1, 5, 6, and 7, the chassis 120 may be arranged above the wheel 102, and the drive and steer shafts 108, 138 may extend from the axle 104, through the surface of chassis 120, to a location at or above a top surface of the chassis 120. In addition, the drive and steer assemblies 106, 118 may be located at or above the top surface of the chassis 120. Thus, with the chassis disposed between the wheel and the drive and steer assemblies 106, 118, the drive and steer assemblies 106, 118 may be protected from environmental conditions that may surround the wheel.

While FIG. 1 shows one drive motor 122, one drive belt 124, and two pulleys 126, 128, the driven caster 100 may include other suitable numbers of motors, drive belts, and pulleys. Also, in some embodiments, drive belt 124 may be wrapped directly to the circumference of at least one of the drive motor 122 or drive shaft 108 without a separate pulley component (e.g., the bottom portion of the drive motor 122 and/or top portion of the drive shaft 108 may function as a pulley).

The term "wheel," in some examples, generally refers to any suitable type of disc or other object that is rotatable about an axis. Examples of wheels include, without limitation, a disc-shaped object that is configured to roll along a surface, a propeller capable of converting rotational movement to thrust (e.g., to drive a boat through the water), or any other type or form of rotatable object. The driven caster described herein can have a multitude of applications. For example, the driven caster may be mounted to a wheelchair, to a hospital bed, to a robot, etc.

Figure 8:
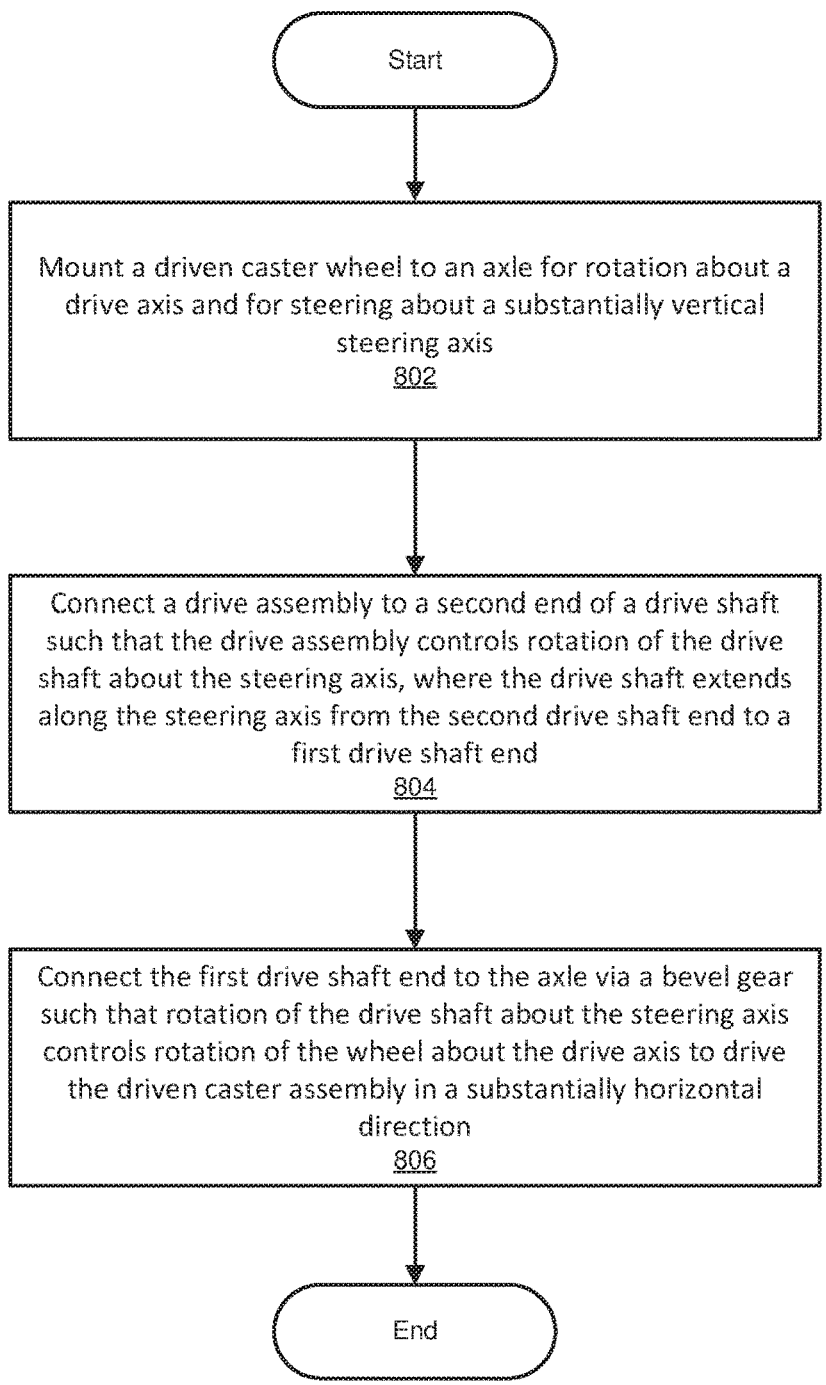
FIG. 8 is a flowchart of a method for assembling a driven caster wheel assembly, according to an embodiment.

Referring now to FIG. 8, also disclosed herein is a method 800 of assembling a driven caster assembly, such as the driven caster 100 described above with reference to FIGS. 1-7. In step 802, a driven caster wheel may be mounted to an axle for rotation about a drive axis and for steering about a substantially vertical steering axis. In step 804, a drive assembly may be connected to a second end of a drive shaft such that the drive assembly controls rotation of the drive shaft about the steering axis. In this example, the drive shaft may extend along the steering axis from the second drive shaft end to a first drive shaft end. In step 806, the first drive shaft end may be connected to the axle via a bevel gear such that rotation of the drive shaft about the steering axis controls rotation of the wheel about the drive axis to drive the driven caster in a substantially horizontal direction.

In some examples, the method may also include mounting a disc brake to the second drive shaft end in order to retard motion of the drive shaft and thereby retard motion of the wheel. In these examples, the method may also include (1) mounting a disc on the second drive shaft end so that the disc rotates about the steering axis along with the drive shaft and (2) mounting a pair of pads proximate the top and bottom surfaces of the disc. The top and bottom surfaces of the disc may extend in a plane substantially perpendicular to the steering axis. The pads may be compressible against the top and bottom surfaces of the disc to retard rotation of the disc and thereby retard rotation of the drive shaft.

The disclosed driven caster wheel assembly may provide many advantages. For example, the wheel's power assembly may be located entirely outside the circumference of the wheel (e.g., entirely above the wheel), thus protecting the power assembly from forceful impacts as well as environmental conditions that may surround the wheel. Similar benefits may be achieved by disposing a brake assembly distally from the wheel. The driven caster disclosed herein may also allow the wheel to freely rotate 360 degrees about its steering axis without becoming entangled by electrical wires or other components of the drive assembly.

The method steps and sequences described herein are given by way of example only and can be varied as desired. For example, while the steps may be discussed in a particular order, these steps do not necessarily need to be performed in the order discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A driven caster wheel assembly, comprising:
   a wheel mounted to an axle for rotation about a drive axis and steering about a substantially vertical steering axis;
   a drive assembly;
   a drive shaft extending along the steering axis from a first drive shaft end to a second drive shaft end, the first drive shaft end being connected to the axle and the second drive shaft end being connected to the drive assembly such that the drive assembly controls rotation of the drive shaft about the steering axis;
   a bevel gear connecting the first drive shaft end to the axle such that rotation of the drive shaft about the steering axis controls rotation of the wheel about the drive axis to drive the driven caster wheel assembly in a substantially horizontal direction; and
   a brake, disposed on the second drive shaft end, configured to retard motion of the drive shaft to thereby retard motion of the wheel, wherein the brake comprises a disc brake having:
      a disc arranged on the second drive shaft end and configured to rotate about the steering axis along with the drive shaft; and
      a pair of pads arranged on top and bottom sides of the disc, wherein the pads are compressible against the top and bottom sides of the disc to retard rotation of the disc and thereby retard rotation of the drive shaft.

2. The driven caster wheel assembly of claim 1, wherein the drive axis and the steering axis together form an oblique angle such that the wheel is tilted relative to the drive shaft.

3. The driven caster wheel assembly of claim 1, wherein the entire drive assembly is located above the wheel.

4. The driven caster wheel assembly of claim 1, wherein the drive assembly comprises a drive motor and a drive belt controlled by the drive motor, the drive belt being wrapped around the second drive shaft end for rotating the drive shaft about the steering axis.

5. The driven caster wheel assembly of claim 1, further comprising:
   a steer assembly; and
   a steer shaft extending along the steering axis from a first steer shaft end to a second steer shaft end, the first steer shaft end being connected to the axle and the second steer shaft end being connected to the steer assembly such that the steer assembly controls rotation of the steer shaft about the steering axis, which in turn steers the wheel about the steering axis.

6. The driven caster wheel assembly of claim 5, wherein the drive shaft is concentrically arranged inside of the steer shaft.

7. The driven caster wheel assembly of claim 5, wherein the steer assembly comprises a steer motor and a steer belt controlled by the steer motor, the steer belt being connected to the second steer shaft end for rotating the steer shaft about the steering axis.

8. The driven caster wheel assembly of claim 1, wherein the wheel is configured to freely rotate 360 degrees about the steering axis.

9. The driven caster wheel assembly of claim 1, wherein the bevel gear comprises a miter gear.

10. The driven caster wheel assembly of claim 1, further comprising a chassis on which the drive assembly is mounted, wherein the chassis is located above the wheel, and the entire drive assembly is located on the chassis.

11. The driven caster wheel assembly of claim 1, wherein the wheel is configured to roll along a surface.

12. The driven caster wheel assembly of claim 11, wherein the bevel gear is configured such that the wheel is tilted relative to the steering axis so that the wheel is steerable about the steering axis at a single point of rotation.

13. The driven caster wheel assembly of claim 1, wherein the wheel is configured to convert rotational movement into thrust to move the driven caster wheel assembly through water.

14. The driven caster wheel assembly of claim 1, wherein the driven caster wheel assembly is mounted to a robot.

15. The driven caster wheel assembly of claim 14, wherein the robot is configured to move through water.

16. The driven caster wheel assembly of claim 14, wherein the brake is disposed distally from the wheel in a manner that protects the brake from environmental damage.

17. The driven caster wheel assembly of claim 1, wherein the top and bottom sides of the disc extend in a horizontal plane that is substantially perpendicular to the steering axis.

18. The driven caster wheel assembly of claim 1, wherein the wheel is tilted at an angle such that when the wheel is on a surface, the wheel rotates about the steering axis at a point that is a center of mass of the wheel.

19. The driven caster wheel assembly of claim 4, wherein:
the drive assembly comprises a pulley coupled to the second drive shaft end; and
the drive belt is coupled to the second drive shaft end via the pulley.

20. The driven caster wheel assembly of claim 5, wherein the steer shaft is mounted to the axle via a casting that is disposed around the bevel gear.

* * * * *